United States Patent
Hering

(10) Patent No.: US 8,615,684 B2
(45) Date of Patent: Dec. 24, 2013

(54) HIGH RELIABILITY PROCESSOR SYSTEM

(75) Inventor: Jeffrey Hering, Oak Creek, WI (US)

(73) Assignee: Astronautics Corporation of America, Milwaukee, WI (US)

( * ) Notice: Subject to any disclaimer, the term of this patent is extended or adjusted under 35 U.S.C. 154(b) by 242 days.

(21) Appl. No.: 13/088,597

(22) Filed: Apr. 18, 2011

(65) Prior Publication Data

US 2012/0265973 A1  Oct. 18, 2012

(51) Int. Cl.
*G06F 11/00* (2006.01)

(52) U.S. Cl.
USPC .......................................... 714/38.12; 14/38.1

(58) Field of Classification Search
USPC .................................................. 714/10, 38.1
See application file for complete search history.

(56) References Cited

U.S. PATENT DOCUMENTS

| | | | | |
|---|---|---|---|---|
| 4,912,708 A | * | 3/1990 | Wendt | 714/55 |
| 5,341,497 A | * | 8/1994 | Younger | 714/51 |
| 5,475,852 A | * | 12/1995 | Yoshida et al. | 714/34 |
| 7,581,138 B2 | * | 8/2009 | Bartucca et al. | 714/25 |
| 8,041,554 B1 | * | 10/2011 | Limondin et al. | 703/22 |
| 2003/0061548 A1 | * | 3/2003 | O'Gorman et al. | 714/43 |
| 2005/0010269 A1 | * | 1/2005 | Lebel et al. | 607/60 |
| 2005/0010745 A1 | * | 1/2005 | Lee et al. | 712/248 |
| 2005/0138509 A1 | * | 6/2005 | Kiryu et al. | 714/726 |
| 2006/0041791 A1 | * | 2/2006 | Carroll et al. | 714/38 |
| 2006/0085645 A1 | * | 4/2006 | Bangui | 713/173 |
| 2006/0156156 A1 | * | 7/2006 | Elnozahy | 714/746 |
| 2008/0155343 A1 | * | 6/2008 | Branca et al. | 714/38 |
| 2008/0276224 A1 | * | 11/2008 | Gyure et al. | 717/126 |
| 2010/0205414 A1 | * | 8/2010 | Miller et al. | 712/227 |

FOREIGN PATENT DOCUMENTS

WO  WO 2008/092846  *  8/2008

\* cited by examiner

*Primary Examiner* — Michael Maskulinski
*Assistant Examiner* — Neil Miles
(74) *Attorney, Agent, or Firm* — Boyle Fredrickson S.C.

(57) ABSTRACT

A method of testing the integrity of microprogramming within a computer processor employs a test calculation designed to exercise instructions and to reveal errors in those instructions. The problem of testing instructions using the very instructions which may possibly be corrupt is addressed by developing a signature passed from instruction to instruction providing a low likelihood of a false positive outcome. A time-out system is used in the evaluation of the test calculation to capture a wide variety of other pathological operating conditions.

13 Claims, 2 Drawing Sheets

HIGH RELIABILITY PROCESSOR SYSTEM

STATEMENT REGARDING FEDERALLY SPONSORED RESEARCH OR DEVELOPMENT

—

CROSS REFERENCE TO RELATED APPLICATION

—

BACKGROUND OF THE INVENTION

The present invention relates to processor architectures and in particular to an architecture for highly reliable software applications.

Computer software used in applications where failure would result in substantial risk to human life or safety, or substantial property damage, is typically subject to a stringent certification process. This certification may review the source code of the software to analyze possible failure mechanisms of the software and typically also reviews the operating system forming part of the software execution environment. For this latter reason, computer software used in critical applications is often certified on open-source operating systems whose inner workings can be analyzed.

Once certified, the software may be linked to a digital signature or checksum so that any modifications or corruption of the software before it is installed on the computer may be readily identified. The digital signature of the software, as it resides in memory, also may be periodically checked for corruption.

The instructions of the software as executed on current processors, in turn, may be executed by sequences of "microinstructions" according to "microprograms". The microprograms are stored on the processor, originally in read-only memory and thus effectively "hard wired" into the processor in a manner unlikely to be changed or corrupted. This practice has given way to storing microprograms in read-only memory and then copying them to alterable memory (e.g. RAM) at start-up. The advantage of this latter technique is that the microprogram may be altered after manufacture of the processor circuit for the purpose of correcting late discovered errors or providing upgrades, both of which may be provided as a data file loaded into the CPU at start-up.

Microprograms stored in alterable memory are subject to corruption or changes outside of the certification process. Manufacturers of such processors provide limited or no documentation as to the operation of the microprograms, no way to upload the microprograms for inspection, and no way to execute a checksum to validate the microprograms.

Potentially, these problems may restrict the use of advanced processor architectures in critical software applications where they might otherwise provide improved processor speed or reduced power consumption.

SUMMARY OF THE INVENTION

The present invention provides a method of validating microprograms stored in a processor in alterable memory without direct accessibility of the microprograms for inspection or checksum evaluation. This validation method employs a test calculation that exercises critical instructions and which is constructed so that successful completion of the test calculation provides a high likelihood that the microprograms are correct with respect to the critical processor instructions. The use of a test calculation is complicated by the fact that evaluation of the test must be conducted by the very instructions which are in fact suspect. The test calculation is therefore constructed to reduce the possibility that pathological failure of the instructions being tested could corrupt the validity of the test results. In one embodiment, the test routine is used to reset a watchdog timer whose expiration triggers an error condition. The address of the reset for the watchdog timer is encoded into the calculation result contributed to by every instruction. This approach substantially eliminates the possibility of instruction errors subverting the detection of instruction errors.

Specifically, the present invention provides a processor executing a stored program, the processor being of a type providing for the execution of instructions implemented through microcode stored in alterable memory on the processor. The stored program executes on the processor to: (a) perform the functions of a first application program employing at least a subset of the microcode stored in alterable memory; (b) perform a calculation employing the subset of the microcode, the calculation provoking an error state of the processor when any of the subset of the microcode is not operating correctly.

It is thus a feature of at least one embodiment of the invention to provide a method of validating microprograms without requiring direct access to the microprograms.

The subset of the microcode may implement instructions that accept data operands and/or flag operands to produce data results and/or flag results and wherein the calculation is provided with given data operands and/or flag operands to provoke the error state when the instructions do not produce the correct data results and/or flag results.

It is thus a feature of at least one embodiment of the invention to verify both instruction data operations and instruction flag operations.

The calculation may employ each instruction at least twice with different operands. The different operands may provide different flag results for a given flag type. Further, the calculation may employ each instruction twice with different flag operands for a given flag type.

It is thus a feature of at least one embodiment of the invention to detect errors that produce "stuck bits" which in a binary device will appear correct under certain single tests.

The calculation may test first results of each instruction to provoke an error state in the processor when any of the first results of any given instruction are not correct and any further test of at least one second result depending on a cumulative execution of the given instructions provokes an error state in the processor when the second results are not correct.

It is thus a feature of at least one embodiment of the invention to test the instructions and the ability of the instructions to evaluate themselves. The second test makes it highly unlikely that instruction failure might disguise other incorrect instructions.

The processor may include a watchdog timer triggering an error state at the conclusion of a predetermined time and the calculation may be performed repeatedly at a period less than the predetermined time. The calculation may reset the timer when the output of the calculation matches the predetermined value indicating that the subset of microcode is correct.

It is thus a feature of at least one embodiment of the invention to provide an error output that is sensitive to a variety of different failure conditions including failure of the calculation to complete.

The calculation may write a value to an address equal to an output of the calculation depending on a cumulative execution of the given instructions and wherein when the subset of microcode executes correctly the output of the calculation matches an address for a reset input to the timer.

It is thus a feature of at least one embodiment of the invention to reduce the chance of certain types of errors, for example erroneous jumps to the correct branch of the test calculation output, from providing a "false positive".

The calculation may enter a delay loop when data results of a given instruction or flag results of a given instruction in the calculation are incorrect. The delay loop may be an infinite loop.

It is thus a feature of at least one embodiment of the invention to provide a reliable method of invoking an error condition that cannot be undone by later errors in the test calculation.

The different operands for a plurality of given instructions may be pseudorandomly related.

It is thus a feature of at least one embodiment of the invention to minimize the possibility of stuck bits producing a false positive in the test calculation.

The first application program may interact with avionics equipment during aircraft flight.

It is thus a feature of at least one embodiment of the invention to permit advanced processor architectures to be used in avionics applications such as electronic flight instruments and electronic flight bags to provide reduced power consumption, reduced weight, and increased processor power.

These particular features and advantages may apply to only some embodiments falling within the claims and thus do not define the scope of the invention. The following description and figures illustrate a preferred embodiment of the invention. Such an embodiment does not necessarily represent the full scope of the invention, however. Furthermore, some embodiments may include only parts of a preferred embodiment. Therefore, reference must be made to the claims for interpreting the scope of the invention.

DETAILED DESCRIPTION OF THE PREFERRED EMBODIMENT

Figure 1:
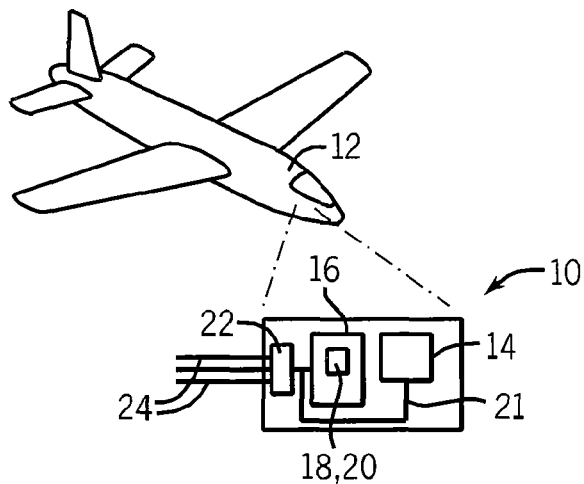
FIG. 1 is a pictorial diagram of a generalized avionics system for use in aircraft, the avionics system employing a computer using a processor of the present invention.

Referring now to FIG. 1, a computer system 10 for providing critical control and/or display functions, for example, in avionics systems for aircraft 12, may include a processor 14 communicating with a memory 16 for executing one or more stored programs 18 contained in the memory. The processor 14 and memory 16 may communicate via an internal bus 21 within interface 22 providing interface lines 24 communicating with other avionics, displays, and user input devices as is understood in the art. The programs 18 may include an operating system and one or more application programs that will typically be certified to work together with the particular hardware processor 14 and interface 22 of the computer system 10. The programs 18 may also include a test calculation 20 of the present invention as will be described below. An example processor 14 is the Intel Atom Z520 Central Processing Unit manufactured by the Intel Corporation of Santa Clara, Calif., USA.

Figure 2:
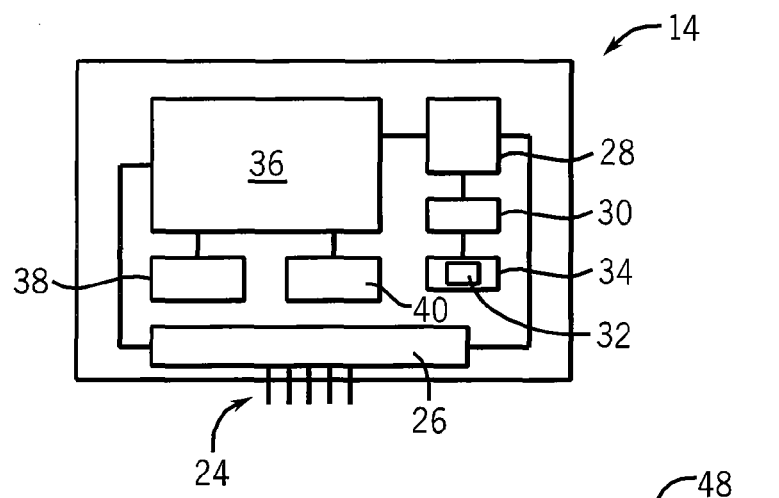
FIG. 2 is a block diagram of a generic processor for use in the computer of FIG. 1.

Referring now to FIG. 2, the processor 14 may communicate over the bus 21 with a cache 26 to read instructions and data from the memory 16 and interface 22 and output results to the memory 16 and interface 22. Instructions in the form of "object code" may be passed to an instruction decoder 28 that receives the instructions as previously prepared by a compiler. Some instructions may be implemented within the processor 14 by a microinstruction sequencer 30 executing microprograms 32 stored in a readable and writable memory 34 (such as nonvolatile or volatile random access memory, the latter refreshed from a nonvolatile memory). Memory 34 may thus be changed after manufacture of the processor 14 for updating or for the correction of errors. By the same token, memory 34 may become corrupted after manufacture of the processor 14 either by uploading of erroneous data or through external events that may affect the contents of the memory 34 such as electromagnetic interference, radiation or the like. The specific radiation of particular concern is high-energy neutrons. These are the result of secondary emissions caused by high-energy cosmic particles entering the atmosphere from outer-space. These particles hit the nucleus of atoms and cause neutrons to be thrown off at high speed. The neutrons, in turn, cause electronic circuit upsets by imparting unwanted electrical energy into an operating circuit. These events are Single-Event Upsets (SEU), which are temporary faults which may be corrected by a power cycle (turning the unit off then on) and Single-Event Errors (SEE), which are permanent faults requiring repair of the equipment.

Instructions or sequences of microinstructions may be passed to an arithmetic logic unit 36 communicating with one or more registers 38 and with counter timers 40 of the type generally known in the art. The counter timers 40 may receive a clock signal (not shown) from a separate clock circuit. As is generally understood in the art, the counter timers 40 may have outputs controlling interrupt lines to the arithmetic logic unit 36 to cause execution of interrupt routines of a type known in the art to "throw" exceptions including those related to detected error conditions. The registers 38 may include registers for holding operands as well as flag registers holding flag bits such as carry, zero, sign, overflow, parity, partial-carry, all known in the art. Outputs from the arithmetic logic unit 36 may also connect to the cache 26 for output from the processor 14.

Figure 3:
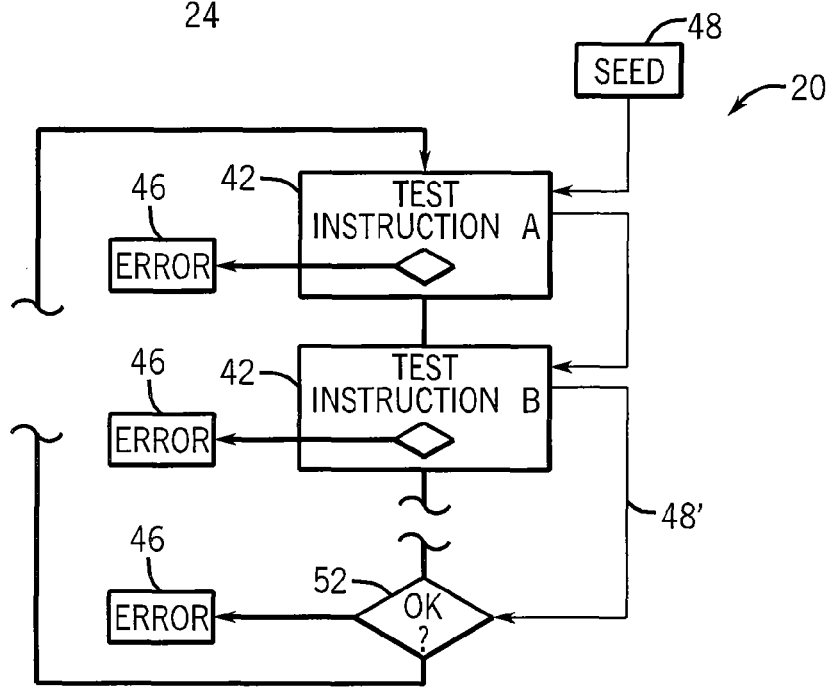
FIG. 3 is a control flow and data flow diagram of a test calculation used to validate microprograms on the processor of FIG. 2, the test calculation including multiple test blocks.

Referring now to FIGS. 1 and 3, the present invention provides as one of the programs 18 a test calculation 20 that is scheduled by the operating system to run periodically together with application programs 18, the latter providing critical control features for the computer system 10 (for example avionics functions). When scheduled, the test calculation 20 executes a loop that tests all critical instructions executed both by the test calculation 20 and other programs 18. Practically, the test calculation 20 may execute all instructions for a reduced instruction set machine or a limited set of instructions enforced during compilation of the program 18.

Referring now to FIG. 3, generally the test calculation 20 provides a control flow indicated by darker lines that includes instruction test blocks 42 which each test an individual object code instruction generally by providing particular inputs (operands) to the instruction and checking for outputs (results). Those operands may be both flag operands and data operands and outputs checked may also be flag results and data results. As will be understood in the art, the data operands will be the arguments to the instruction function, such as the subtrahend and minuend of a subtraction instruction and the data results will be the value of the instruction function such as the difference. The flag results further characterize the data results, for example, with respect to overflow or sign. The flag operands allow additional inputs to the functions required, for example, in the case of addition with carry instructions.

Each instruction test block 42 compares the instruction results to expected values. If there is a match between the instruction results and expected values the test calculation 20 proceeds to the next instruction test block 42 otherwise the test calculation 20 proceeds to an error state 46 which causes the signaling of an error either to an external device through interface 22 (shown in FIG. 1), or by restarting the computer system 10, or by other means. The error state 46 may place outputs controlled by the computer system 10 into a safe state.

In one embodiment, the error state provokes a reset or power cycling of the processor 14 to ensure a reset of internal CMOS latch-ups. In this way, the microprograms 32 are reloaded into memory 34 and the CPU is restarted from scratch.

Referring still to FIG. 3, the test calculation 20 also provides a data flow indicated by the lighter lines in which a seed value 48 is operated on by each instruction at instruction test blocks 42 to ultimately produce modified seed value 48' depending on the correct execution of each instruction of instruction test block 42. This modified seed value 48' is checked for correctness as indicated by decision block 52 which again may invoke the error state 46 if that correctness is not established.

As will be described below, in one embodiment, the modified seed value 48' is checked for correctness by using the seed value as an address to reset a watchdog timer. Failure to periodically reset the watchdog timer or attempting to reset the watchdog using an incorrect address will ultimately lead to the watchdog timing out, causing the processor to enter an error state. The present invention, however, is not limited to this type of correctness check.

If the modified seed value 48' tests correctly, the program 20 repeats periodically interleaved with the first application programs 18, as scheduled through the operating system. This repetition is represented diagrammatically by the loop back to process block 42 which should be understood to reload the seed 48 and begins execution of the test program 20 again on a regular schedule.

The dual level of testing of each instruction both individually at instruction test blocks 42 and cumulatively in the passing of the seed value 48 through each instruction to the test block 52 insures not only that the instructions are executing correctly but this also provides a defense against the possibility that the instructions are sufficiently corrupt as to subvert the entire calculation, for example, by introducing defects into the evaluation of instruction test blocks 42 to cause jumps around particular instruction test blocks 42 or the like. As will be described further below the implementation of the block 52 and the error states 46 will also provide assurances against certain failure modes, for example, the test calculation 20 stalling at a particular instruction (in an infinitive loop) or ceasing to execute for other reasons.

Figure 4:
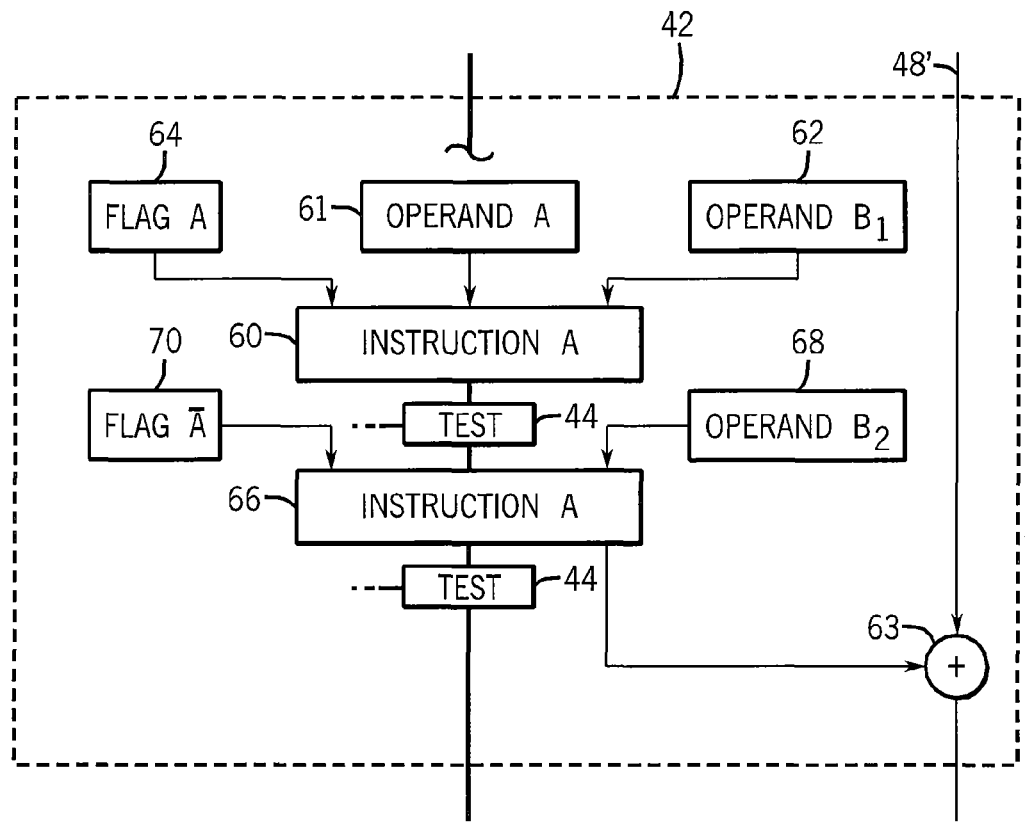
FIG. 4 is a detailed control flow and data flow diagram of one test block of FIG. 3.

Referring now to FIG. 4, each instruction test blocks 42 may provide for multiple tests of each instruction, for example, to test a particular instruction against two different flag states and two different operands to reduce the possibility of failing to detect "stuck bits" that created an appearance of proper instruction execution but only for the particular operand and or flag provided. For this purpose, the flag operands and data operands will generally have different or complementary values. Thus, for example, a first instruction 60 may receive a first and second stored operand 61 and 62 and predetermined flag operand 64. The data results and flag result of the instruction 60 is tested per internal decision block 44 which may invoke an error state 46 if the output is incorrect. Otherwise instruction is again tested at process block 66 using the output of the instruction 60 as one operand and a new second operand 68 and a different flag 70, for example, being the complement of the flag operand 64.

In one embodiment the operands 61, 62 and 68 are selected to be related to each other and all other operands of the test calculation 20 as if generated by a pseudorandom sequence, that is, to be statistically uniformly distributed. This helps detect possible systematic hardware errors (for example a stuck bit at a particular bit data word location).

This output process block 66 is also checked for errors at decision block 44 and if the data result and flag result are error free, the data result is added to the seed value 48 at summing instruction 63 to create a modified seed value 48' ultimately reflecting the calculations of every instruction test block 42. This modified seed value 48' will be used later for watchdog reset at process block 52.

An example of one such instruction test block 42 is now provided below:

Example I

```
1   mov   ebp, 0E642967Bh   ; set signature using initial seed
                            ; other instruction tests
                            ; test of the add-with-carry (ADC)
                              instruction
2   mov   eax, 05567DBD2h   ; load test value
3   stc                     ; set carry
4   adc   eax, 012345678h   ; perform test
5   jc    $                 ; carry? yes: fail
6   cmp   eax, 0679C324Bh   ; incorrect result?
7   jnz   $                 ; yes: fail
8   adc   eax, 098765432h   ; perform test
9   jnc   $                 ; carry? no: fail
10  cmp   eax, 00012867Dh   ; incorrect result?
11  jnz   $                 ; yes: fail
12  add   ebp, eax          ; update signature;
13                          ; test of the add-with-carry (ADC)
                              instruction
                            ; other instruction tests
14  mov   dword ptr [ebp], 1 ; attempt to reset hardware watchdog
```

This example shows a test of an "add with carry instruction" (adc) forming one of the instruction test blocks 42 described above. The test of this adc instruction adds two data operands together along with a carry flag operand to produce a data result and a carry flag result.

At line (1) the initial seed value (0E642967Bh) is loaded into register "ebp". This step is not part of the individual instruction test blocks but precedes them all. As will be understood this value and the subsequently described values are expressed in hexadecimal.

At line (2) a first prestored test operand 62 (05567 DBD2h) is loaded into the register "eax" and at line (3) the carry flag is set.

At line (4) an add with carry instruction is executed with an additional operand (012345678h). If the add with carry instruction is executed correctly, the value of 679C324Bh will be produced with no carry. The test of the carry (jump if carry) is indicated at line (5) which causes a jump to itself (hence an infinite loop) if there is, in fact, a carry. As will be explained below, this loop will cause the throwing of an error condition.

If the absence of a carry flag result correctly occurred, the program proceeds to line (6) and the output is compared against 679C324Bh, the correct data result output. If the output of the execution of line (4) is correct, the result of the comparison instruction at line (6) will be zero. At line (7) a test of this result (jump if not zero) causes an infinite loop if there was an error in the instruction of line (4) (the result of the cmp instruction was not zero) and otherwise allows the program to proceed to line (8) if the result of the cmp instruction was zero.

At line (8), a second test of the add with carry instruction is done by adding to the previous output (679C324Bh) the value 098765432h. The carry flag is implicitly set to zero at this point and thus need not be expressly reset. The results of the execution of the add with carry should produce a carry flag and a result 00012867Dh. A test of the carry flag and of the output of the instruction is performed at lines (9)-(11) similar to that described above.

At the conclusion of the test of the each instruction, the output of the instruction is added to the seed value 48 or modified seed value 48' as discussed above by summing instruction 63, and as indicated at line (12) to provide a running total reflecting the results of every successfully tested instruction.

At the conclusion of the tests of all the instructions (only one of which is shown in this example) the resulting modified seed value 48' is used to write a bit (1) to the address pointed to by the resulting modified seed value 48' which matches a reset address (memory mapped) of a watchdog timer whose expiration causes transition to the error state. This matching is obtained by selection of the initial seed value 48 to equal the correct address required by the watchdog reset block 52 minus the sum of all additions performed by summing instruction 63. This step is not part of the instruction text blocks 42 but follows them all.

It will be understood that the watchdog timer may be preloaded with a value and operated to countdown and the reset may re-load the value, or the watchdog timer may count upward to a limit value triggering the interrupt and the reset may set it to zero. The value in the watchdog timer is set to be sufficiently long that it can be ensured that the test calculation 20 will complete at least one time before the watchdog timer expires as scheduled by the operating system.

It will be understood that the infinite loops created by the decision blocks 44 will equally cause a transition to the error state by allowing expiration of the watchdog timer.

As noted above, the arithmetic logic unit 36 communicates with multiple flags: carry, zero, sign, overflow, parity, and partial-carry, for example. The above example can be extended to each of these different flags by analogy for different appropriate instructions. Generally, instructions may modify (1) one or more flags and data, (per the above example), (2) only flags, (3) only data, or (4) neither. By way of example a "test" instruction (bitwise-AND, then set flags) only modifies flags, "move" is an example of an instruction which modifies only data, and "jump" is an example which modifies neither. Each of these instruction types may be tested by modifying the above example to accommodate these differences.

In summary, the present invention provides a straightforward test that may be performed for each instruction. The results of each test are compared to the expected values and the CPU will enter an infinite loop if any result is found to be faulty. This is problematic, in that the CPU may not be able to diagnose problems within itself, nor should it be entirely trusted to do so. The test calculation 20 is designed to address this issue. The idea is every test has a result or signature that is a numerical value. The results of all tests are added together to produce a unique sum. The initial seed value is equal to the hardware watchdog timer address minus this sum. Starting from the initial seed value and adding all the various signature values during testing will produce, if everything is working correctly, an end result that is equal to the hardware watchdog address. This address is then used to attempt to reset the watchdog to keep the CPU alive. In the event an incorrect answer is obtained at any step, or any steps are skipped, or the watchdog reset itself is skipped, the hardware watchdog mechanism will not be deactivated, the watchdog timer will trigger, and the CPU will be reset. It is important to note that the watchdog reset address is never coded directly into the program, so that the code cannot accidentally load and use the watchdog reset address.

While the inventors do not wish to be bound by a particular theory, it is believed that the, probability of an incorrectly functioning CPU producing a correct watchdog address is 1 in $2^{32}$, or roughly 1 in 4,000,000,000.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a controller" and "a processor" can be understood to include one or more controllers or processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

I claim:

1. A computer system comprising:
a processor executing a stored program, the processor providing for an execution of instructions on the processor, the stored program executing on the processor to:
 (a) perform functions of a first application program employing at least a subset of the instructions;
 (b) perform a calculation employing the subset of the instructions, the calculation provoking an error state of the processor when any of the subset of the instructions is not operating correctly, the calculation further entering a predetermined delay loop when the results of a given instruction in the calculation are incorrect;
 wherein the processor includes a timer triggering an error state at a conclusion of a predetermined time and wherein the calculation is performed repeatedly at a period less than the predetermined time and wherein the processor resets the timer using at least one instruction in the subset of instructions only when the result of the calculation matches a correct output value and wherein the correct output value provides an address of a memory mapped reset of the timer used by the processor to reset the timer.

2. The computer system of claim 1 wherein the subset of the instructions accept data operands and flag operands and produce data results and flag results and wherein the calculation is provided with given data operands and flag operands and provokes the error state when the instructions do not produce correct data results or correct flag results.

3. The computer system of claim 2 wherein the instructions include at least both addition and subtraction and wherein the flag operand and flag result are selected from the group consisting of: carry, sign and overflow flags.

4. The computer system of claim 2 wherein the calculation employs each instruction at least twice with different data operands.

5. The computer system of claim 2 wherein the different operands produce different flag results for a given flag type.

6. The computer system of claim 2 wherein the calculation employs each instruction at least twice with different flag operands for a given flag type.

7. The computer system of claim 1 wherein the calculation tests first results of each instruction to provoke an error state in the processor when any of the first results of any given instruction are not correct and wherein the calculation tests at least one second result depending on a cumulative execution of the given instructions and provokes an error state in the processor when the second results are not correct.

8. The computer system of claim 1 wherein the calculation writes a value to an address equal to the output of the calculation depending on a cumulative execution of the instructions and wherein when the subset of instructions executes correctly the output of the calculation matches an address for a reset input to the timer.

9. A computer system comprising:
a processor executing a stored program, the processor providing for an execution of instructions on the processor, the stored program executing on the processor to:
 (a) perform functions of a first application program employing at least a subset of the instructions;
 (b) perform a calculation employing the subset of the instructions to calculate a value, the calculation provoking an error state of the processor when any of the subset of the instructions is not operating correctly;
 wherein the calculation enters a predetermined delay loop when data results of a given instruction or flag results of a given instruction in the calculation are incorrect;
 wherein a correct value of the calculation provides an address of a memory mapped reset of a timer used by the processor to reset a timer, the timer triggering an error state at a conclusion of a predetermined time; and
 wherein the processor resets the timer using at least one instruction in the subset of instructions.

10. The computer system of claim 9 wherein the delay loop is an infinite loop.

11. The computer system of claim 1 wherein a plurality of operands for a plurality of given instruction are pseudorandomly related.

12. The computer system of claim 1 wherein the first application program interacts with avionics equipment during aircraft flight.

13. A method of testing a processor of a type providing for the execution of instructions on the processor, the method comprising the steps of:
 (a) performing the functions of a first application program employing at least a subset of the instructions;
 (b) performing a calculation employing the subset of the instructions, the calculation providing a predetermined value when the subset of instructions is properly operating;
 (c) provoking an error state of the processor when the calculation provides a value different from the predetermined value and by entering a predetermined delay loop when data results of a given instruction or flag results of a given instruction in the calculation are incorrect;
 (d) wherein the processor includes a timer triggering an error state at a conclusion of a predetermined time and wherein the calculation is performed repeatedly at a period less than the predetermined time and wherein the processor resets the timer using at least one instruction in the subset of instructions, wherein the predetermined value provides an address of a memory mapped reset of the timer used by the processor to reset the timer; and
 wherein the processor resets the timer using at least one instruction in the subset of instructions.

* * * * *